March 29, 1932. J. J. GOELLNER 1,851,170
CLUTCH CONTROL FOR STAPLING MACHINES
Filed Sept. 11, 1929
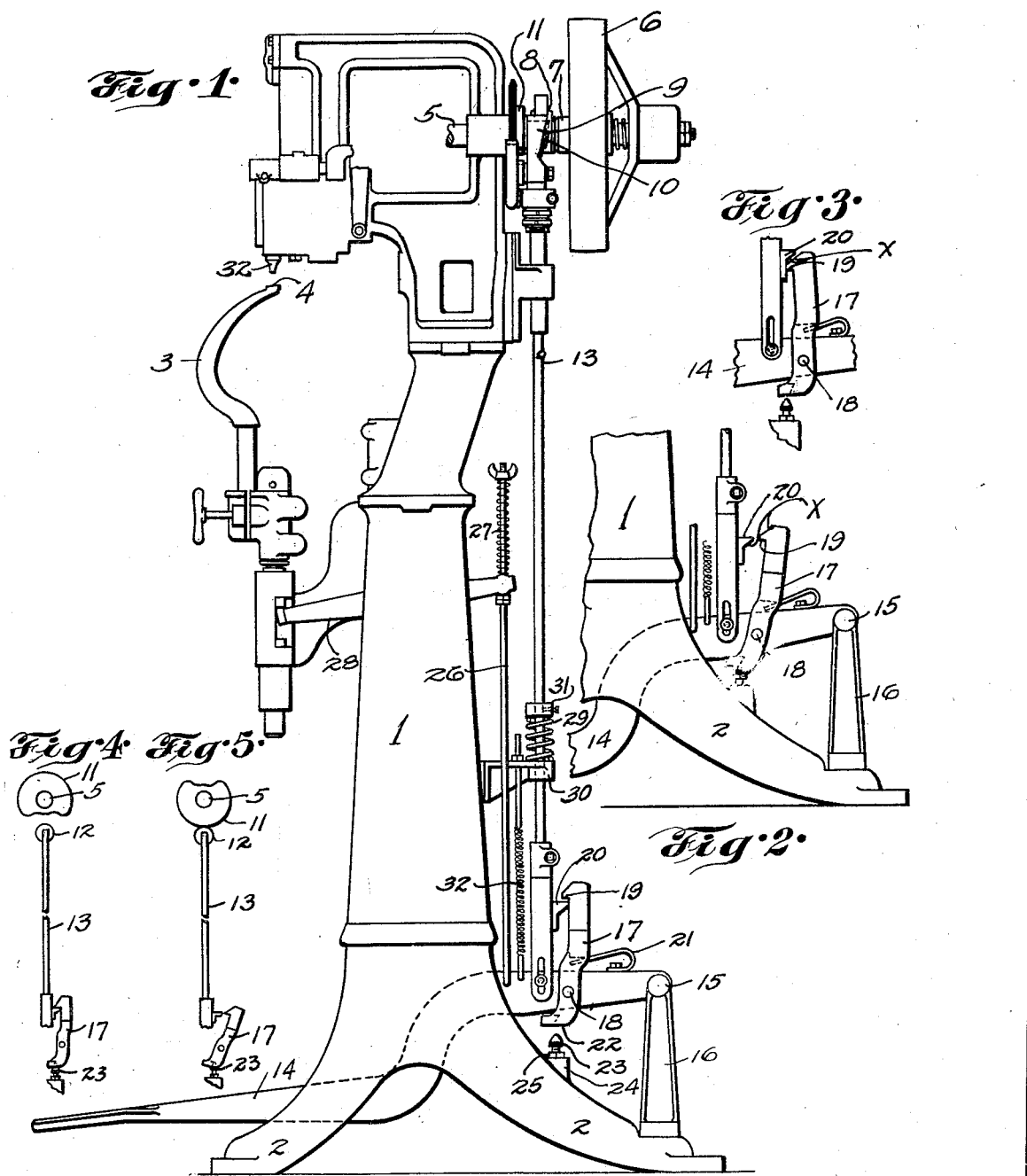
Inventor
Joseph J. Goellner
By Rodney Bedell
Attorney Patented Mar. 29, 1932

1,851,170

UNITED STATES PATENT OFFICE

JOSEPH J. GOELLNER, OF ST. LOUIS, MISSOURI, ASSIGNOR TO LANDIS MACHINE COMPANY, OF ST. LOUIS, MISSOURI, A CORPORATION OF MISSOURI

CLUTCH CONTROL FOR STAPLING MACHINES

Application filed September 11, 1929. Serial No. 391,790.

My invention relates to shoe working machinery and more particularly to a machine for driving fasteners through the sole of a shoe and parts associated therewith.

My invention has been developed with special regard for application to a shoe stapler of a well known type illustrated in Patent No. 1,016,930, issued February 13, 1912 to W. H. Borden. Such machines although driven by power are actuated manually for each successive driving operation. In other words, the operator depresses a treadle every time a staple is to be driven. This operator control is effected through a clutch between the machine and the driving mechanism, the clutch functioning when the treadle is depressed and being disengaged automatically at the end of each driving operation if the treadle is not depressed.

In running such a machine, the operator is supposed to place the shoe in position for the driving of a staple, then to depress the treadle, release the treadle, shift the shoe into position for the next staple, then depress the treadle again, etc.

While this cycle of operations may be followed effectively by a skilled operator, it is possible for the operator to depress the treadle before the shoe has been shifted into the proper position for a new staple, or the operator may not release the pressure on the treadle quick enough or lift his foot far enough to permit the clutch to disengage. Under such conditions, a second staple will be driven on top of the first staple or at an improper distance from the same, and it is the general object of my present invention to provide such a machine with a device which will render this faulty and undesirable condition impossible. In other words, I desire to provide an automatic release of the clutch during each cycle of operations of the machine and irrespective of the operator's removal of pressure from the treadle.

In such staplers, as previously operated, the depression of the treadle elevates the shoe supporting horn and presses the shoe against the throat of the stapler. If the operator releases the treadle too quickly and before the staple is completely driven (in order to avoid the premature driving of the second staple) he is likely to lower the horn before the driving of the first staple is completed.

Another object of my invention is to eliminate such undesirable operation of the horn and to make it possible to leave the horn in elevated position without necessarily continuing the staple driving operations.

In the accompanying drawings which illustrate a selected embodiment of my invention—

Figure 1 is a side elevation of a stapler showing the column, shoe support and clutch shifting portion of a stapling machine of the type referred to, the remaining parts being omitted as they are well known and do not form part of my present invention.

Figure 2 is a similar view of some of the parts in the lower portion of Figure 1 but shown in a different position.

Figure 3 is a similar view showing the parts in a third position.

Figures 4 and 5 are diagrammatic views of the relation between the clutch operating cam and the interengaging elements of my invention associated therewith.

The column or standard 1 of the machine is provided with spreading legs 2 and mounts the shoe support 3 having the anvil 4. The main shaft of the machine is indicated at 5 and mounts a loose pulley 6 adapted to be driven by a belt from a motor or countershafting in the usual manner.

A clutch disk, the hub of which is shown at 7 is slidably but non-rotatably mounted on shaft 5 and is adapted to frictionally engage an inner wall of pulley 6. Collar 8 rides on shaft 5 and engages hub 7 and also engages a yoke 9 which may move transversely of the shaft. The interengaging surfaces of collar 8 and yoke 9 are inclined as indicated at 10 whereby downward movement of the yoke thrusts collar 8 to the right thereby moving the clutch disk into engagement with the pulley 6 whereby shaft 5 is rotated to operate the machine. A cam 11 on shaft 5 engages a cam roller 12 on yoke 9 as soon as the shaft starts to rotate and holds the yoke down until the rotation of the shaft is completed when the roller is freed from the cam and yoke 9 may rise, thereby releasing the clutch disk from the pulley.

Yoke 9 is manually operated by pull rod 13. A treadle 14 is fulcrumed at 15 on a bracket 16 mounted on the base of the machine and a latch 17 is pivoted to the treadle at 18 and has a hook-like upper end provided with a downwardly-facing element 19. A corresponding element 20 is adjustably mounted on the lower end of pull rod 13. A spring 21 tends to hold latch 17 with its hook 19 engaged with element 20 as shown in Figure 1.

The lower end of latch 17 extends to the left beyond the latch pivot 18, as indicated at 22, and is adapted to engage a stationary member 23 mounted on a boss 24 on the base of the machine. I show member 23 as being threaded into boss 24 and provided with a lock nut 25 whereby the member may be adjusted in height to contact with latch element 22 after any desired downward movement of the latch has taken place.

A spring 29 is seated on a bracket 30 on column 1 and yieldingly supports rod 13 in elevated position by engagement of collar 31. A spring 32 yieldingly supports the treadle from bracket 30.

A link 26 extends upwardly from treadle 14 and through a spring 27 operates a lever 28 to raise the shoe support 3 to clamp the shoe between anvil 4 and the stapler throat 32 in the usual manner.

When treadle 14 is depressed by the operator sufficiently to engage elements 19 and 20 and pull rod 13 and yoke 9 downwardly far enough to start the machine operating, a slight additional downward movement of the treadle (such as is almost certain to result since the physical effort can scarcely be gauged exactly) causes member 23 to swing the latch 17 to the position shown in Figure 2 in which elements 19 and 20 are disengaged. This frees rod 13 from the treadle and permits the same to be raised by spring 29 until roller 12 engages cam 11 which will bring element 20 above the level of element 19. Thereafter, the operator's release of treadle 14 will allow the same to be raised by spring 32, and the latch 17, freed from contact with member 23 will be thrust by spring 21 into the position indicated in Figure 3. Further upward movement of the latch will cause the bevelled surfaces X to ride over each other until the elements 19 and 20 are again in interengaging position as shown in Figure 1. The clutch actuating mechanism is now in position for a second cycle of operations which will be initiated by depression of treadle 14 by the operator.

Since the connection between the treadle and the clutch is "broken" at each operation and it is necessary for the operator to permit the treadle to move to its uppermost position before the connection can be re-established, it is obvious that the operator cannot drive a second staple by holding the treadle in depressed position or because of such quick repeated depression of the treadle as would cause the machine to operate before the shoe support had been lowered and the operator's hands be given a chance to shift the shoe.

Furthermore, the operator is left free to maintain the horn 3 in elevated position until the staple is completely driven without risking the undesirable driving of a second staple. If the operator desires to shift the shoe gauge or adjust the driver, he can hold the treadle depressed with the shoe clamped between the anvil and throat and use both hands for manipulating the stapler parts.

With my device, the beginner may operate the stapler satisfactorily, and even the skilled operator can devote his attention more fully to details other than the exact timing of the clutch control. The speed of operation is not affected.

Obviously, the details of the device may be varied indefinitely and modifications in the details would not affect the principle of operation which I have described. I contemplate the exclusive use of such variations in structure as come within the scope of my claims.

I claim:

1. In a machine of the class described, co-operating clutch parts, spring means tending to hold said parts disengaged, mechanism for engaging said parts including two members through which the operator's movement is transferred to at least one clutch part, interengaging elements connecting said members to each other, means distinct from said elements for automatically disengaging said elements after a predetermined initial movement of said members, and means effective upon engagement of said clutch parts to positively hold said parts engaged until the cycle of operations of the machine is completed, said means also serving to disengage said parts at the completion of said cycle regardless of the position of said members.

2. In a machine of the class described, driving mechanism, driven mechanism, clutch parts adapted to be engaged to connect the driving mechanism with the driven mechanism, a member shiftable manually to a position to engage said parts, a spring normally holding said member out of said position, a cam on said driven mechanism engaging said member and adapted to hold it in said position against the thrust of said spring until the cycle of operations of the machine is completed, a foot treadle, co-operating latch elements on said foot treadle and member whereby depression of said treadle will move said member to said position, and means associated with said elements for disengaging same after predetermined movement of said foot treadle and said cam.

3. In a machine of the class described, driv-